(12) United States Patent
Nguyen et al.

(10) Patent No.: US 9,852,725 B2
(45) Date of Patent: Dec. 26, 2017

(54) ACOUSTIC ABATEMENT SYSTEM FOR AIR COOLED HEAT EXCHANGER

(71) Applicant: General Electric Company, Schenectady, NY (US)

(72) Inventors: Quoc Hoai Nguyen, Friendswood, TX (US); Arkadiusz Bartlomiej Nagorski, Warsaw (PL); Eric Tracy Watson, Houston, TX (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 14/357,115

(22) PCT Filed: Jun. 11, 2013

(86) PCT No.: PCT/PL2013/000080
§ 371 (c)(1),
(2) Date: May 8, 2014

(87) PCT Pub. No.: WO2014/200369
PCT Pub. Date: Dec. 18, 2014

(65) Prior Publication Data
US 2016/0180828 A1    Jun. 23, 2016

(51) Int. Cl.
*G10K 11/16*    (2006.01)
*F22B 37/02*    (2006.01)
(Continued)

(52) U.S. Cl.
CPC ............ *G10K 11/161* (2013.01); *F22B 37/02* (2013.01); *F22B 37/36* (2013.01); *F28B 1/06* (2013.01);
(Continued)

(58) Field of Classification Search
CPC .. F22B 37/02; F22B 37/36; F28B 1/06; F28F 2265/28; G10K 11/161; F16L 55/02; F24F 13/24
(Continued)

(56) References Cited

U.S. PATENT DOCUMENTS 3,845,627 A * 11/1974 Hutchinson ............... F03G 7/04
165/45
3,942,588 A * 3/1976 Schoonman ............ F28B 1/06
165/125
(Continued)

*Primary Examiner* — Jianying Atkisson
*Assistant Examiner* — Joel Attey
(74) *Attorney, Agent, or Firm* — Ernest G. Cusick; Hoffman Warnick LLC

(57) ABSTRACT

A system configured to thermally regulate heat dissipation of a power plant system (e.g. steam turbine, gas turbine compressor, intercooler or other fluidic thermal source, etc.) and acoustically attenuate operation of an air cooled heat exchanger via sound reflection, sound absorption, sound diffraction, and/or active noise cancellation is disclosed. In one embodiment, a system includes: a set of inner barriers; a base barrier disposed beneath the set of inner barriers; a set of outer barriers disposed about the base barrier and the set of inner barriers, the set of outer barriers including a top surface located above a bottom surface of the set of inner barriers; a heat exchanger fluidly connected to a power generation system and disposed within the set of inner barriers; and a set of fans disposed within the set of inner barriers and configured to form a flow of air through the set of inner barriers.

18 Claims, 6 Drawing Sheets

(51) Int. Cl.
  *F22B 37/36* (2006.01)
  *F28B 1/06* (2006.01)
  *F24F 13/24* (2006.01)
  *F16L 55/02* (2006.01)

(52) U.S. Cl.
  CPC ............... *F16L 55/02* (2013.01); *F24F 13/24* (2013.01); *F28F 2265/28* (2013.01)

(58) Field of Classification Search
  USPC ........................................................ 165/135
  See application file for complete search history.

(56) References Cited

U.S. PATENT DOCUMENTS

| | | | | |
|---|---|---|---|---|
| 4,019,951 | A | * | 4/1977 | Kragh ...................... B01D 1/16 159/4.04 |
| 4,130,613 | A | * | 12/1978 | Hourai ...................... F28C 1/10 261/109 |
| 4,543,218 | A | * | 9/1985 | Bardo ....................... E04H 5/12 261/111 |
| 4,592,877 | A | * | 6/1986 | Phelps ...................... F28C 1/00 261/109 |
| 4,807,718 | A | | 2/1989 | Lotz |
| 6,070,860 | A | | 6/2000 | Kinney, Jr. et al. |
| 7,201,011 | B2 | | 4/2007 | MacDonald et al. |
| 7,937,963 | B1 | | 5/2011 | Semmes |
| 2003/0214055 | A1 | | 11/2003 | Yazici et al. |
| 2007/0062143 | A1 | * | 3/2007 | Noushad .................. B32B 3/12 52/426 |

\* cited by examiner

ACOUSTIC ABATEMENT SYSTEM FOR AIR COOLED HEAT EXCHANGER

FIELD OF THE INVENTION

The subject matter disclosed herein relates to thermal regulation systems and, more particularly, to acoustic abatement systems for air cooled heat exchangers.

BACKGROUND OF THE INVENTION

Some systems, for example certain nuclear, fossil fuel, solar, simple-cycle and combined-cycle power plant systems, employ thermal regulation systems (e.g., heat exchangers, air cooled heat exchangers, etc.) in their design and operation. During operation these thermal regulation systems may cool portions of and/or fluids within the power plant systems (e.g., in turbines, between compressors) via a radiator system and a set of fin fan coolers. In these systems, a fluid (e.g., water, glycol, etc.) may be passed through a high temperature medium via a set of pipes which then circulate the fluid to the heat exchanger (e.g., a radiator system) where the set of fin fan coolers pass a large quantity of air by the fluid for convective cooling. As a result of the size of some power generation systems and the temperature extremes inherent therein, some thermal regulation systems must continuously pass a large amount of air (e.g., about 400 pounds to about 500 pounds per second) through the heat exchanger to meet operational demands. This large quantity of air movement may require a large set of fan coolers to draw the necessary amount of air from the environment to run over the heat exchanger to cool components of the power plant systems. However, these finned fan coolers may be susceptible to recirculation (e.g., intake of exhausted air) and the use of this set of fan coolers may result in inconsistent cooling fluid temperatures and noise pollution.

BRIEF DESCRIPTION OF THE INVENTION

Systems for acoustically attenuating operation of a thermal regulation system via sound reflection, sound absorption, sound diffraction, and/or active noise cancellation are disclosed. In one embodiment, a system includes: a set of inner barriers; a base barrier disposed beneath the set of inner barriers; a set of outer barriers disposed about the base barrier and the set of inner barriers, the set of outer barriers including a top surface located above a bottom surface of the set of inner barriers; a heat exchanger fluidly connected to a power generation system and disposed within the set of inner barriers; and a set of fans disposed within the set of inner barriers and configured to form a flow of air through the set of inner barriers.

A first aspect of the invention provides a system including: a set of inner barriers; a base barrier disposed beneath the set of inner barriers; a set of outer barriers disposed about the base barrier and the set of inner barriers, the set of outer barriers including a top surface located above a bottom surface of the set of inner barriers; a heat exchanger fluidly connected to a power generation system and disposed within the set of inner barriers; and a set of fans disposed within the set of inner barriers and configured to form a flow of air through the set of inner barriers.

A second aspect of the invention provides an acoustic abatement system for a thermal regulation system, the acoustic abatement system including: a set of inner barriers shaped to house a heat exchanger and a set of fans; a base barrier disposed beneath the set of inner barriers, the base barrier substantially separated from the set of inner barriers; and a set of outer barriers disposed about the base barrier and the set of inner barriers, the set of outer barriers oriented to enable a flow of air into the set of inner barriers and including a top surface located above a bottom surface of the set of inner barriers.

A third aspect of the invention provides a power generation system including: a gas turbine; at least one generator operably connected to the gas turbine; and a thermal regulation system operably connected to the gas turbine or the at least one generator, the thermal regulation system including: a set of inner barriers; a base barrier disposed beneath the set of inner barriers; a set of outer barriers disposed about the base barrier and the set of inner barriers, the set of outer barriers including a top surface located above a bottom surface of the set of inner barriers; a heat exchanger fluidly connected to the gas turbine or the at least one generator and disposed within the set of inner barriers; and a set of fans disposed within the set of inner barriers and configured to form a flow of air through the set of inner barriers.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure may not necessarily be to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

As indicated herein, aspects of the invention provide for systems configured to reduce recirculation and acoustically attenuate operation of a thermal regulation system (e.g., a finned fan cooler, etc.) via sound reflection, sound absorption, sound diffraction, and/or active noise cancellation. These systems include a heat exchanger (e.g., a fin fanned air cooler) disposed with a set of fans proximate ground level (e.g., at a height about equivalent to ground level) above a chamber (e.g., a sunken chamber) and substantially surrounded by a set of barriers (e.g., walls). In an embodiment, the set of barriers may include an inner barrier and an outer barrier which are disposed proximate one another. The outer barrier may be disposed substantially below ground level, and the inner barrier may include a lower surface disposed below a topmost portion/surface of the outer barrier (e.g., causing portions of the inner barrier and the outer barrier to overlap) and may extend substantially above a height of the outer barrier.

Figure 1:
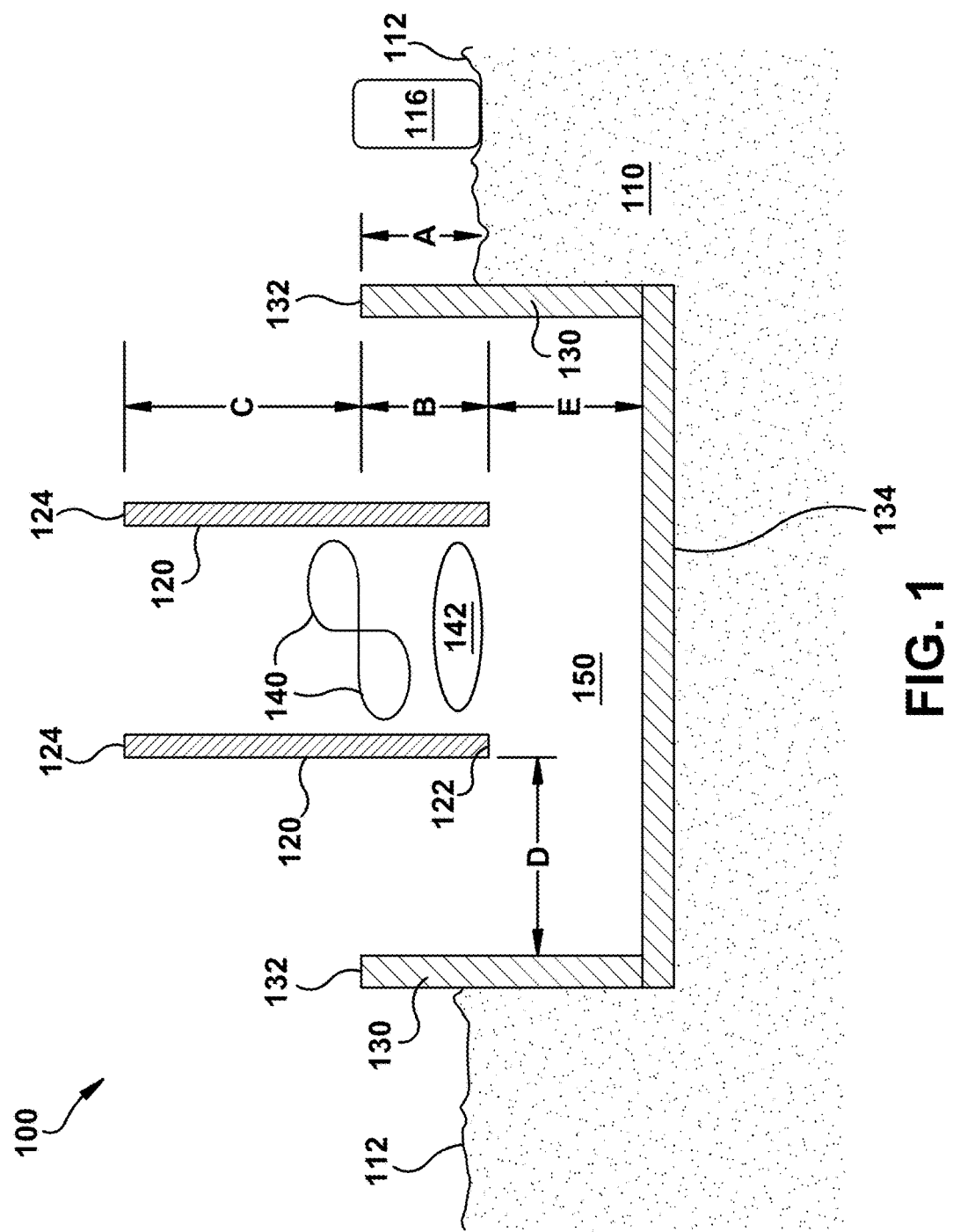
FIG. 1 shows a schematic illustration of a thermal regulation system disposed below ground level in accordance with an embodiment of the invention.

Turning to the FIGURES, embodiments of a thermal regulation system configured to acoustically attenuate operation of the thermal regulation system by locating a heat exchanger proximate ground level and including a set of barrier walls about and/or beneath the heat exchanger and a set of fans are shown. Each of the components in the FIGURES may be connected via conduit, or other conventional means as is indicated in FIGS. 1-6. Specifically, referring to FIG. 1, a schematic view of a thermal regulation system 100 including a heat exchanger 142 located proximate ground level 112 below a set of fans 140 (e.g., fan blades, motors, etc.) and between a set of barriers is shown in accordance with an embodiment of the invention. Set of fans 140 are configured to flow a fluid (e.g., dry air, atmospheric air, ambient air, etc.) through heat exchanger 142 to thermally regulate a medium/fluid (e.g., glycol, water, etc.) being passed there through from a turbine, intercooler, etc. Set of fans 140 and heat exchanger 142 are disposed proximate ground level 112 and above a chamber 150 which is formed substantially below ground level 112. Chamber 150 may be substantially defined by a set of outer barriers 130 and a base barrier 134. In one embodiment, chamber 150 may be disposed (e.g., dug into) in a soil structure 110 (e.g., earth, ground, etc.). Soil structure 110 may include top soil, sand, gravel, etc. In an embodiment, a set of inner barriers 120 may be located substantially about set of fans 140 and heat exchanger 142. Set of inner barriers 120 may be located between set of outer barriers 130 and above base barrier 134. As can be seen in FIG. 1, the configuration of set of inner barriers 120, set of outer barriers 130, set of fans 140, heat exchanger 142, and chamber 150 are such that there is not a direct line/noise path from set of fans 140 and heat exchanger 142 to an object 116 (e.g., a person, a building, etc.) disposed on ground level 112 outside of thermal regulation system 100. Set of inner barriers 120 and/or set of outer barriers 130 may enclose (e.g., surround) heat exchanger 142 and/or set of fans 140. In one embodiment, set of inner barriers 120 and set of outer barriers 130 may include concentric uneven walls.

In an embodiment, set of fans 140 and/or heat exchanger 142 may be disposed substantially planar relative to ground level 112. In one embodiment set of fans 140 and/or heat exchanger 142 may be disposed between about 1 meter below and about 1 meter above a plane of ground level 112. Locating set of fans 140 and/or heat exchanger 142 proximate to ground level 112 may reduce acoustic proliferation and may further ease pumping of fluid through heat exchanger 142. It is understood that active noise cancellation may include analysis of noise source waveforms and generation of a sound wave which may phase shift and/or invert the polarity of the original signal. Control and/or amplification of this sound wave may create a sound wave directly proportional to the amplitude of the original waveform which may create destructive interference, thereby effectively reducing the noise level of the noise source waveforms.

In an embodiment, set of inner barriers 120 and/or set of outer barriers 130 may include concrete. In one embodiment, set of inner barriers 120 may include concrete and set of outer barriers 130 may include metal (e.g., sheet metal lined with absorptive materials). In another embodiment, set of inner barriers 120 and/or set of outer barriers 130 may include porous concrete and/or a set of cinder blocks. The set of cinder blocks may include tunable sections which may be set to a blade-pass frequency for set of fans 140. In another embodiment, set of inner barriers 120 and/or set of outer barriers 130 may include a set of patterned (e.g., cavities, sound-absorbing cavities, ridges, etc.) and/or hollow walls. An outside surface of set of inner barriers 120 and/or set of outer barriers 130 may be painted and/or sealed. It is understood that while descriptions are made to specific materials and compositions herein, these descriptions are merely examples and set of inner barriers 120 and/or set of outer barriers 130 may include any material now known or later developed. Further, any number and/or configuration of inner barriers 120 and outer barriers 130 may be used in accordance with the invention, the number and configuration of inner barriers 120 and outer barriers 130 may be tunable/adjustable to match blade-pass frequencies for set of fans 140.

In an embodiment of the present invention, set of outer barriers 130 may include a first outer top surface 132 which is disposed at a distance A above ground level 112. Distance A may be greater than a height of a normal noise receiver (e.g., human ear, office window, residential window, etc.). First outer top surface 132 may be patterned to inhibit mixing (e.g., recirculation) in thermal regulation system 100. In one embodiment, set of inner barriers 120 may include a first inner top surface 124 which is located at a distance C above first outer top surface 132 of set of outer barriers 130. Distance C may provide a path/elevation for exhaust 182 (shown in FIG. 3) to exit thermal regulation system 100 to the atmosphere and be discharged several feet in the air above the inlet.

Set of inner barriers 120 may further include a first bottom surface 122 which is located a distance B below first outer top surface 132 of set of outer barriers 130. Distance B represents an overlap between set of outer barriers 130 and set of inner barriers 120 which prevents set of fans 140 and/or heat exchanger 142 from having a direct horizontal line of sight with an object 116 (e.g., a person, a building, etc.) disposed on ground level 112 outside of thermal regulation system 100. In an embodiment, set of inner barriers 120 may be located at a distance D from set of outer barriers 130 and first bottom surface 122 may be located at a distance E above base barrier 134. Distance D and/or distance E may be sized so as to allow full flow/draw of air (e.g., unimpeded, unimpinged, minimal pressure drop, etc.) into set of inner barriers 120 of thermal regulation system 100 by set of fans 140. In one embodiment, chamber 150 and/or set of outer barriers 130 may extend about 3 to about 4 meters below ground level 112. Inner barriers 120, outer barriers 130, and/or base barrier 134 may be tuned in respect to a specific heat exchanger 142 and/or set of fans 140.

Figure 2:
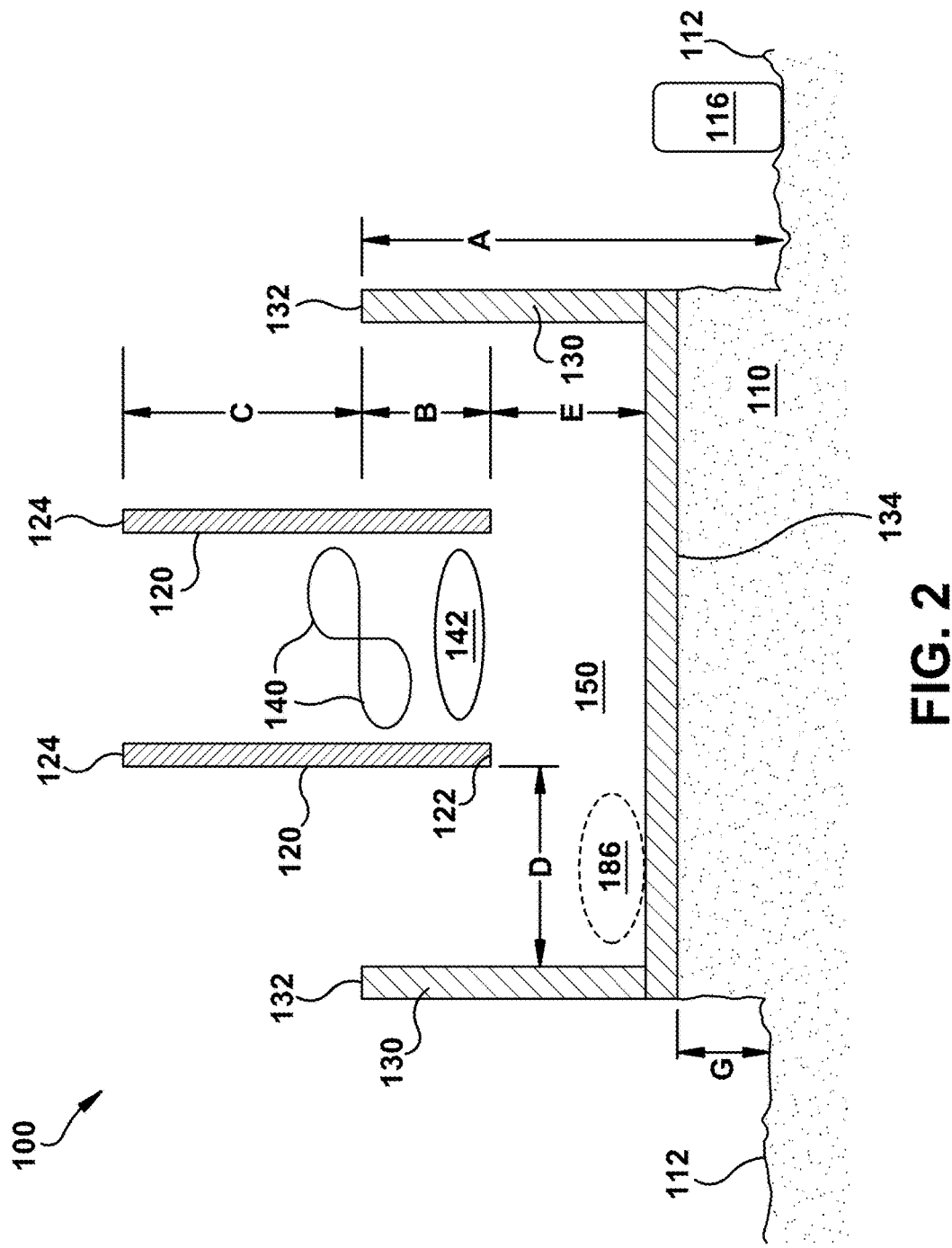
FIG. 2 shows a schematic illustration of a thermal regulation system disposed above ground level in accordance with an embodiment of the invention.

Turning to FIG. 2, a schematic view of thermal regulation system 100 located at a distance G above ground level 112 and including a set of barriers 120 and 130 is shown in accordance with an embodiment of the invention. As can be seen in FIG. 2, chamber 150 may be disposed at distance G above ground level, thereby increasing a magnitude of A and elevating set of fans 140 and heat exchanger 142 relative to ground level 112 and/or object 116. In an embodiment, thermal regulation system 100 may include an active noise cancellation system 186 (shown in phantom) which is configured to destructively interfere with noise generated during operation of thermal regulation system 100. It is understood that active noise cancellation system 186 may include any form of active noise cancellation now known or later developed including analysis of noise source waveforms and generation of a sound wave which may phase shift and/or invert the polarity of the original signal. Further, operation of active noise cancellation system 186 may include control and/or amplification of this sound wave which may create a sound wave directly proportional to the amplitude of the original waveform which may create destructive interference, thereby effectively reducing the noise level of the noise source waveforms.

Figure 3:
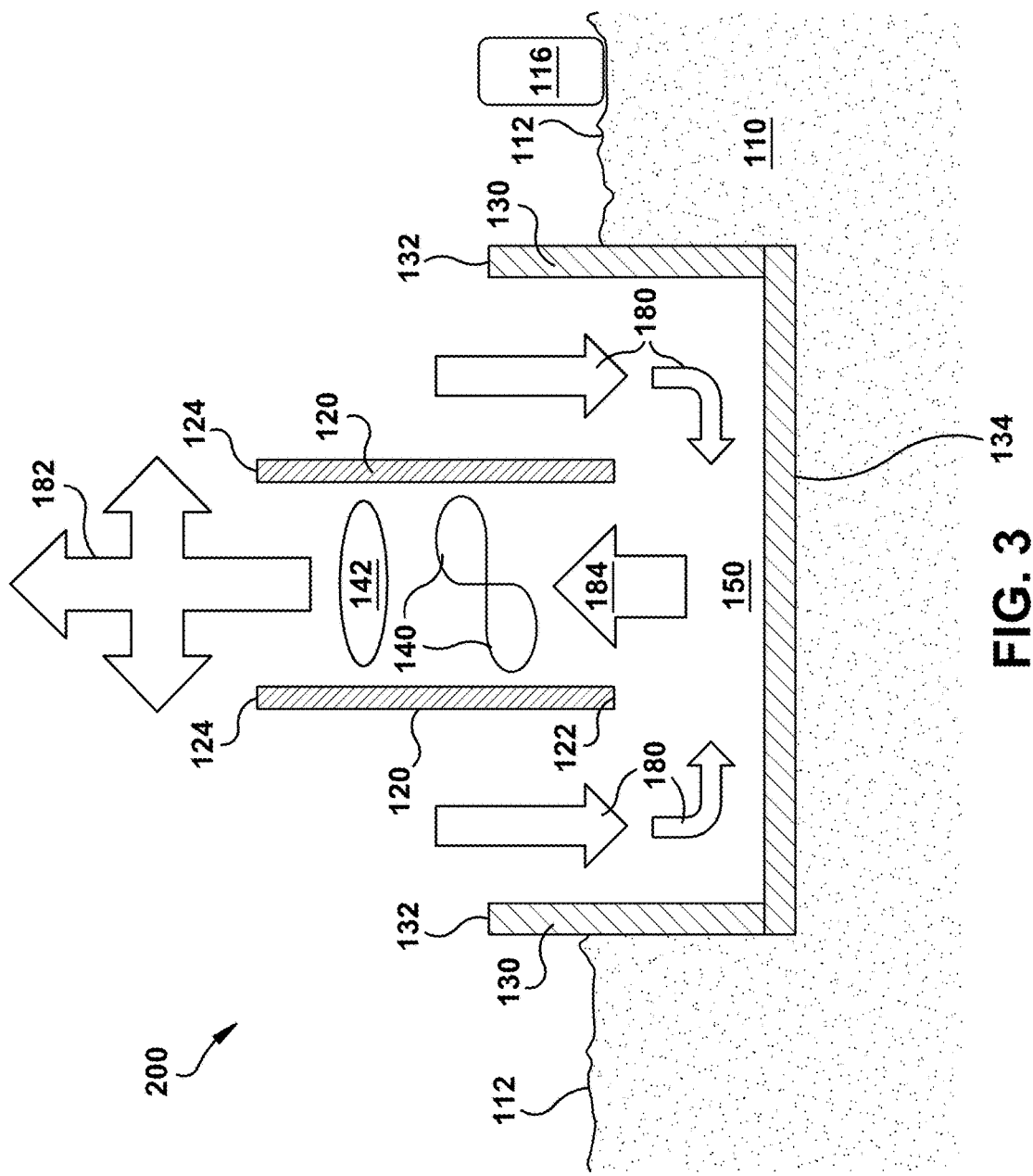
FIG. 3 shows a schematic illustration of air flow through a thermal regulation system in accordance with an embodiment of the invention.

Turning to FIG. 3, a schematic view of air flow through a thermal regulation system 200 including heat exchanger 142 located above set of fans 140 and disposed between a set of barriers is shown in accordance with an embodiment of the invention. In this embodiment, an air flow 180 may be drawn through a supply channel between set of inner barriers 120 and set of outer barriers 130 via set of fans 140. Air flow 180 may be drawn in from all sides of thermal regulation system 200 and directed/drawn over/across heat exchanger 142 as a combined flow 184 by set of fans 140 and/or set of inner barriers 120. Once combined flow is passed through heat exchanger 142 and absorbs thermal energy therefrom, combined flow 184 may be released/exhausted from thermal regulation system 200 as exhaust flow 182. In an embodiment, combined flow 184 and/or exhaust flow 182 may have a velocity which is greater than a velocity of air flow 180 as a result of channeling through set of inner barriers 120. It is understood that while specific embodiments and arrangements of components are described herein (e.g., heat exchanger 142 disposed above set of fans 140, heat exchanger 142 disposed below set of fans 140, etc.), these are merely examples and that any combination of components (e.g., heat exchanger 142 disposed between a set of fans 140) may be used in accordance with embodiments of the invention.

Figure 4:
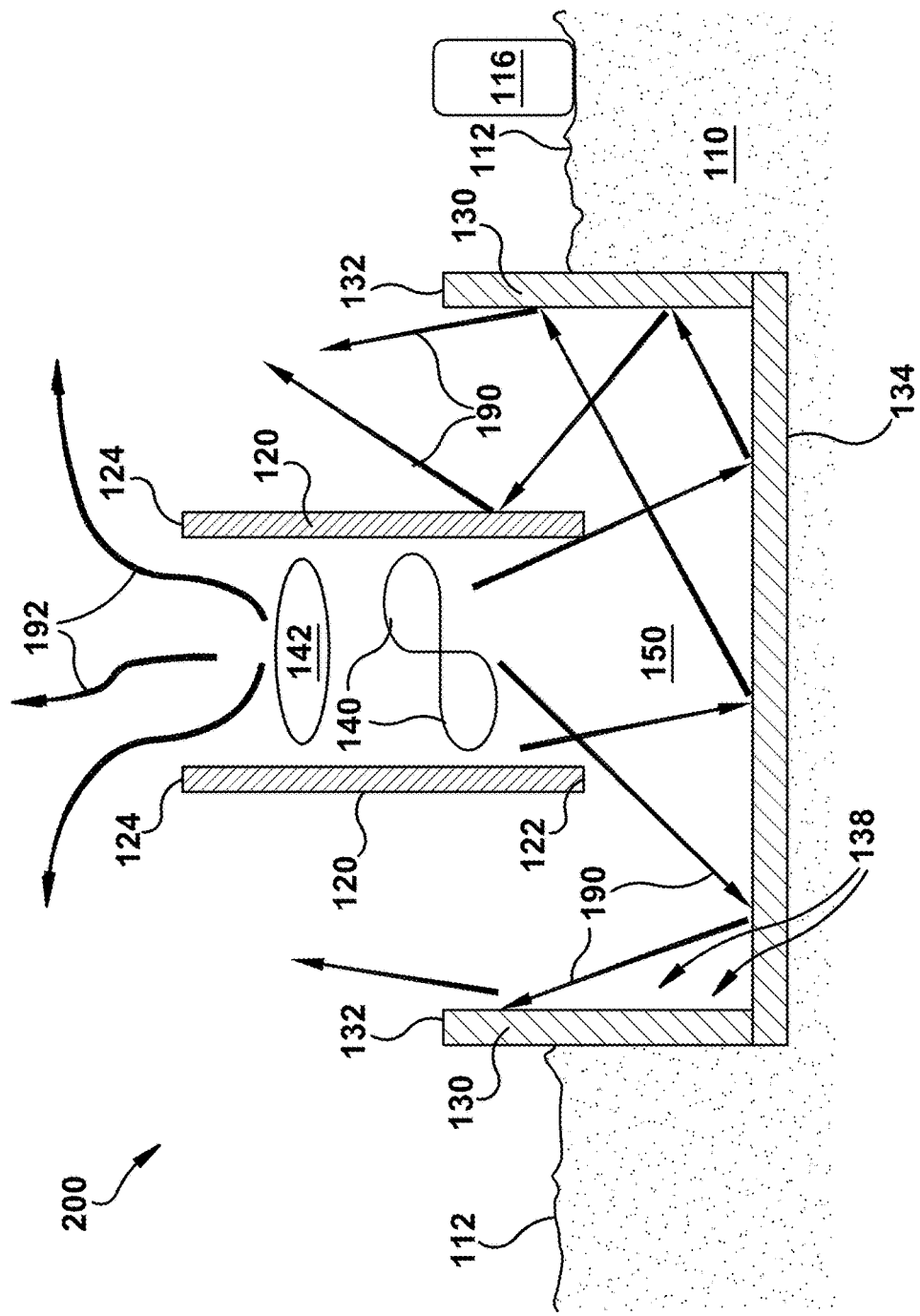
FIG. 4 shows a schematic illustration of acoustic wave flow through a thermal regulation system in accordance with an embodiment of the invention.

Turning to FIG. 4, a schematic view of a first acoustic flow 190 (e.g., sound waves, noise, etc.) and a second acoustic flow 192 through thermal regulation system 200 during operation is shown in accordance with an embodiment of the invention. As can be seen in FIG. 4, arrangement/configuration of set of inner barriers 120 and set of outer barriers 130 as described herein may provide acoustic attenuation through sound reflection, sound absorption, sound diffraction, and/or active noise cancellation. In this embodiment, set of inner barriers 120 and set of outer barriers 130 may absorb and/or direct acoustic flows 190 and 192 substantially upward into the atmosphere for dissipation. Acoustic flows 190 and 192 may have a point of origin substantially proximate to the set of fans 140 (e.g., being primarily generated by fan blades) and heat exchanger 142 during operation, and may be diffracted via bending through chamber 150, set of inner barriers 120, set of outer barriers 130, and base barrier 134.

As can be seen in FIG. 4, acoustic flow 190 which is initially directed substantially downward may be reflected from base barrier 134 toward set of outer barriers 130 and/or set of inner barriers 120 which may channel acoustic flow upward to the atmosphere. In an embodiment, set of outer barriers 130 may include a surface 138 (e.g., a substantially vertical surface) which includes a set of acoustic absorbers/acoustically absorptive materials. In one embodiment, surface 138 may be modified to enhance acoustic attenuation. Porous concrete, acoustically absorptive concrete, or other rough, acoustically absorptive materials may be applied to surface 138 and/or base barrier 134. In another embodiment, base barrier 134 may be partially covered with gravel. Acoustic flow 192 is initially directed upward and may be channeled by set of inner barriers 120 to the atmosphere. In an embodiment, set of inner barriers 120 and set of outer barriers 130 overlap (e.g., distance B shown in FIG. 1) so as to eliminate any direct path for acoustic flows 190 and 192 from set of fans 140 and heat exchanger 142 to an object 116 (e.g., a person, a building, etc.) disposed on ground level 112 outside of thermal regulation system 200. In one embodiment, set of inner barriers 120 and/or set of outer barriers 130 may be shaped to direct acoustic flows 190 and 192 skyward.

Figure 5:
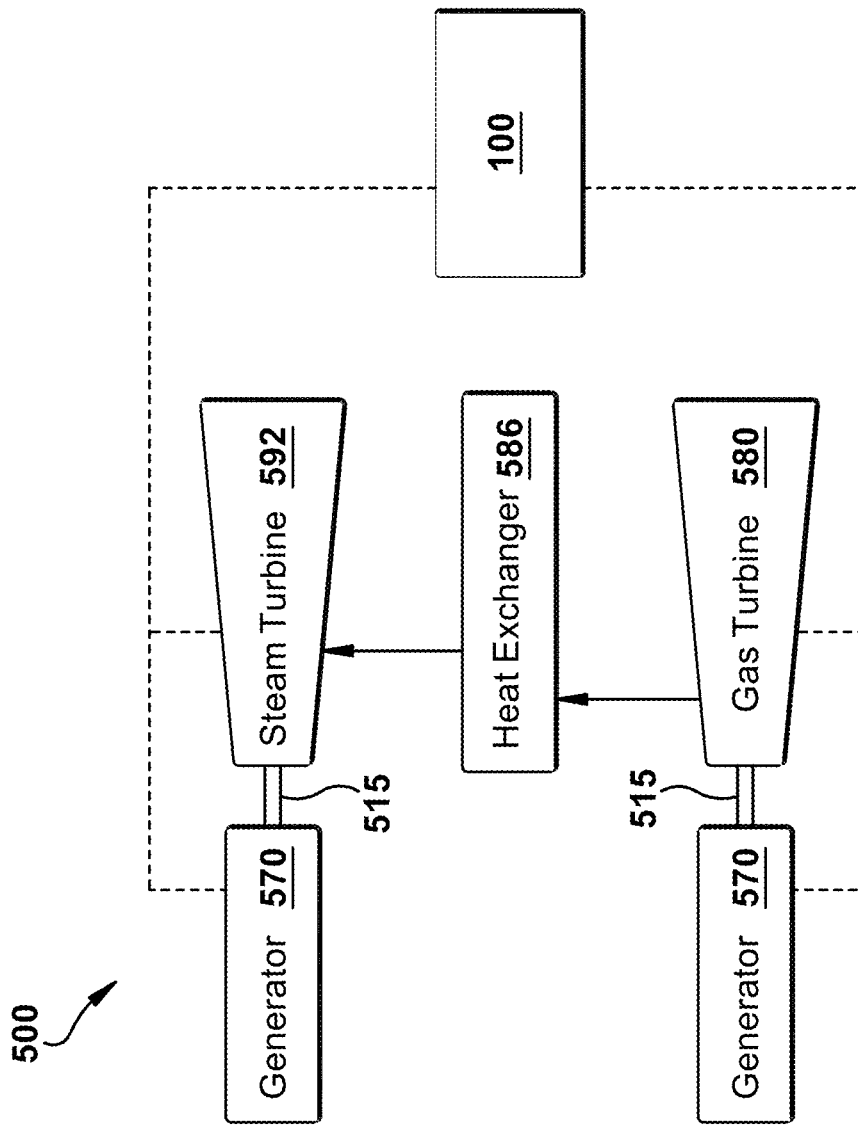
FIG. 5 shows a schematic view of portions of a multi-shaft combined cycle power plant in accordance with an aspect of the invention.

Turning to FIG. 5, a schematic view of portions of a multi-shaft combined-cycle power plant 500 is shown. Combined-cycle power plant 500 may include, for example, a gas turbine 580 operably connected to a generator 570. Generator 570 and gas turbine 580 may be mechanically coupled by a shaft 515, which may transfer energy between a gas turbine 580 and generator 570. Also shown in FIG. 5 is a heat exchanger 586 operably connected to gas turbine 580 and a steam turbine 592. Heat exchanger 586 may be fluidly connected to both gas turbine 580 and steam turbine 592 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). Any of generator system 570, gas turbine 580, and steam turbine 592 may be operably connected to thermal regulation system 100 of FIG. 1, or other embodiments described herein. It is understood that generators 570 and shafts 515 may be of any size or type known in the art and may differ depending upon their application or the system to which they are connected. Common numbering of the generators and shafts is for clarity and does not necessarily suggest these generators or shafts are identical. In another embodiment, shown in FIG. 6, a single-shaft combined-cycle power plant 600 may include a single generator 570 coupled to both gas turbine 580 and steam turbine 592 via a single shaft 515. Single generator 570, gas turbine 580, and/or steam turbine 592 may be operably connected to thermal regulation system 100 of FIG. 1 or other embodiments described herein.

Figure 6:
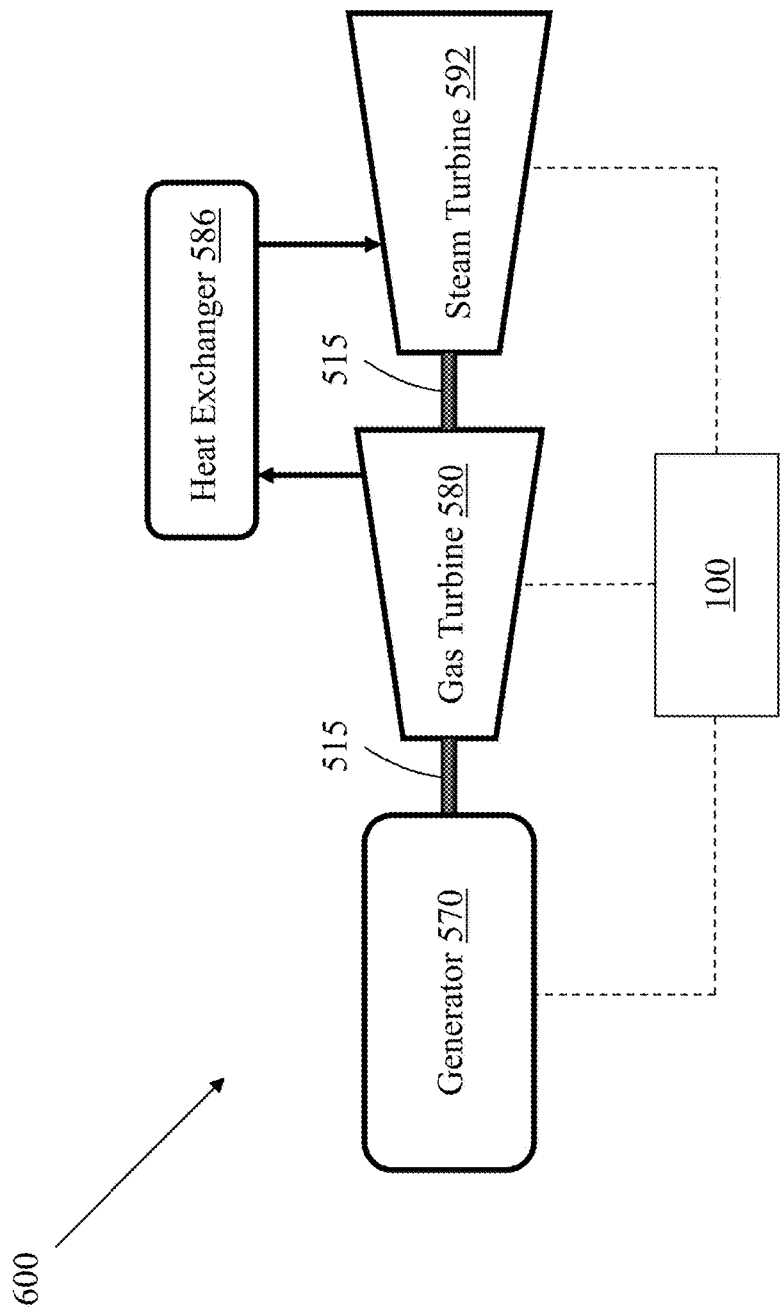
FIG. 6 shows a schematic view of portions of a single-shaft combined cycle power plant in accordance with an aspect of the invention.

The configurations illustrated in FIGS. 5-6 represent only examples of options for deploying thermal regulation system 100 in a multi-shaft combined-cycle power plant and a single-shaft combined-cycle power plant, respectively, and are not meant to limit the scope of the various embodiments of the present invention. For example, in FIGS. 5-6, it may be desirable to have a fluid connection between heat exchanger 586 and thermal regulation system 100. Those skilled in the art will appreciate that other connections between components of the combined-cycle power plants shown in FIGS. 5-6 and the thermal regulation system 100 are possible.

The thermal regulation system of the present disclosure is not limited to any one power generation system, combined-cycle power generation system, turbine or other system, and may be used with other power systems. For example, the various embodiments of the present invention may be suitable for use with other combined-cycle power generation systems than those illustrated in FIGS. 5-6 and co-generation power plants. Additionally, the various embodiments of the present invention may be used with other systems not described herein that may benefit from the thermal regulation and acoustic abatement provided by the thermal regulation system described herein. For example, the various embodiments of the thermal regulation system described herein may be suitable for use with carbon recovery systems.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a pair of vertically parallel inner barriers;
   a base barrier disposed beneath the pair of vertically parallel inner barriers;
   a pair of vertically parallel outer barriers disposed about the base barrier, wherein the pair of vertically parallel inner barriers are disposed within the pair of vertically parallel outer barriers, the pair of vertically parallel outer barriers including a top surface located above a bottom surface of the pair of vertically parallel inner barriers, and wherein the pair of vertically parallel inner barriers and the pair of vertically parallel outer barriers include porous concrete;
   a fin fanned cooler heat exchanger, located proximate ground level and fluidly connected to a power generation system and disposed within the pair of vertically parallel inner barriers; and
   a set of fans located between the pair of vertically parallel inner barriers, wherein the set of fans is disposed at a substantially planar position relative to ground level.

2. The system of claim 1, wherein the pair of vertically parallel inner barriers and the pair of vertically parallel outer barriers are configured to absorb sound.

3. The system of claim 1, wherein the top surface of the pair of vertically parallel outer barriers and the bottom surface of the pair of vertically parallel inner barriers are located proximate ground level.

4. The system of claim 1, wherein the base barrier is located below ground level, above ground level, or at ground level.

5. The system of claim 1, wherein the pair of vertically parallel inner barriers includes a top surface which is located above the fin fanned cooler heat exchanger, wherein the top surface of the pair of vertically parallel outer barriers is located below the top surface of the pair of vertically parallel inner barriers.

6. The system of claim 1, wherein the pair of vertically parallel inner barriers and the pair of vertically parallel outer barriers are shaped to attenuate sound by reflection, diffraction, active noise cancellation or combinations thereof.

7. The system of claim 1, wherein the pair of vertically parallel inner barriers and the pair of outer vertically parallel barriers are oriented to attenuate sound by reflection, diffraction, active noise cancellation or combinations thereof.

8. The system of claim 1, wherein the pair of vertically parallel inner barriers, the base barrier, and the pair of vertically parallel outer barriers are oriented to allow airflow into the pair of vertically parallel inner barriers.

9. The system of claim 1, further comprising:
   a supply channel defined by an inner surface of the pair of vertically parallel outer barriers and an outer surface of the pair of vertically parallel inner barriers; and
   a chamber disposed within the pair of vertically parallel outer barriers, the chamber being located above the base barrier and below a bottom surface of the pair of vertically parallel inner barriers,
   wherein the fin fanned cooler heat exchanger is configured to form a flow of air through the supply channel, the chamber, and within the pair of vertically parallel inner barriers.

10. The system of claim 1, further comprising a set of fans located between the pair of vertically parallel inner barriers, wherein the set of fans is disposed between one meter below ground level and one meter above ground level.

11. An acoustic abatement system for a thermal regulation system, the acoustic abatement system comprising:
    a set of inner barriers shaped to house a fin fanned cooler heat exchanger having a set of fans;
    a base barrier disposed beneath the set of inner barriers, the base barrier substantially separated from the set of inner barriers defining a channel there between; and
    a set of outer barriers disposed about the base barrier, wherein the set of inner barriers is disposed within the pair of outer barriers, the set of outer barriers oriented to enable a flow of air into the set of inner barriers and including a top surface located above a bottom surface of the set of inner barriers, and wherein the inner barriers and outer barriers are vertically parallel and the inner barriers and the pair of vertically parallel outer barriers include porous concrete;
    the fin fanned cooler heat exchanger located proximate ground level;
    a set of fans located between the pair of vertically parallel inner barriers, wherein the set of fans is disposed at a substantially planar position relative to ground level;
    wherein the set of inner barriers includes a top surface which is located above the fin fanned cooler heat exchanger.

12. The system of claim 11, wherein the set of inner barriers and the set of outer barriers are configured to attenuate sound by reflection, absorption, diffraction, active noise cancellation or combinations thereof.

13. The system of claim 11, wherein the top surface of the set of outer barriers is located between the bottom surface of the set of inner barriers and the top surface of the set of inner barriers.

14. A power generation system comprising:
    a gas turbine;
    at least one generator operably connected to the gas turbine; and a thermal regulation system operably connected to the gas turbine or the at least one generator, the thermal regulation system including:
- a pair of vertically parallel inner barriers including a top surface and a bottom surface;
- a base barrier disposed beneath the pair of vertically parallel inner barriers;
- a pair of vertically parallel outer barriers disposed about the base barrier, wherein the pair of vertically parallel inner barriers are disposed within the pair of vertically parallel outer barriers, the pair of vertically parallel outer barriers including a top surface located above the bottom surface of the pair of vertically parallel inner barriers, wherein the top surface of the pair of vertically parallel outer barriers is located below the top surface of the pair of vertically parallel inner barriers and wherein the pair of vertically parallel inner barriers and the pair of vertically parallel outer barriers include porous concrete;
- a fin fanned cooler heat exchanger located proximate ground level and fluidly connected to the gas turbine or the at least one generator and disposed within the pair of vertically parallel inner barriers, wherein the pair of vertically parallel inner barriers includes a top surface which is located above the fin fanned cooler heat exchanger; and
- a set of fans located between the pair of vertically parallel inner barriers, wherein the set of fans is disposed at a substantially planar position relative to ground level.

15. The power generation system of claim 14, wherein the pair of vertically parallel inner barriers and the pair of vertically parallel outer barriers are configured to absorb sound.

16. The power generation system of claim 14, wherein the top surface of the pair of vertically parallel outer barriers and the bottom surface of the pair of vertically parallel inner barriers are located proximate ground level.

17. The power generation system of claim 14, wherein the pair of vertically parallel inner barriers and the pair of vertically parallel outer barriers are shaped to attenuate sound by reflection, diffraction, active noise cancellation or combinations thereof.

18. The power generation system of claim 14, wherein the pair of vertically parallel inner barriers, the base barrier, and the pair of vertically parallel outer barriers are oriented to allow the fin fanned cooler heat exchanger to draw airflow into the pair of vertically parallel inner barriers.

* * * * *